Feb. 18, 1936.  G. KUHN  2,031,168
ILLUMINATING APPARATUS
Filed Jan. 10, 1931   3 Sheets-Sheet 2
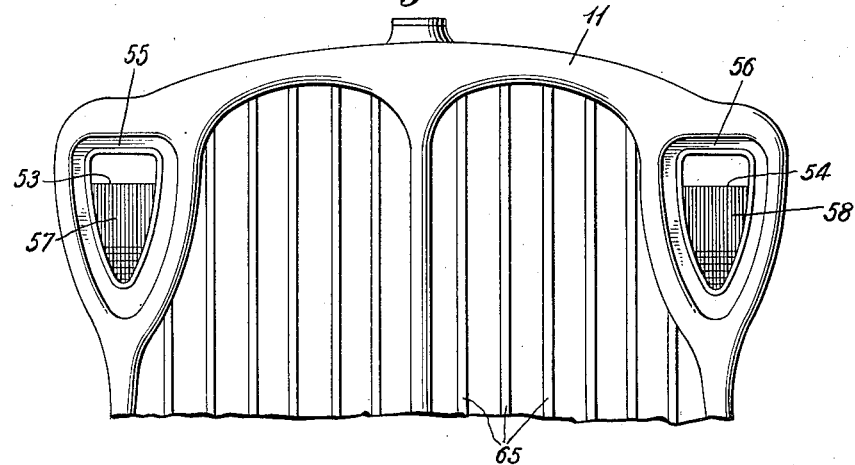
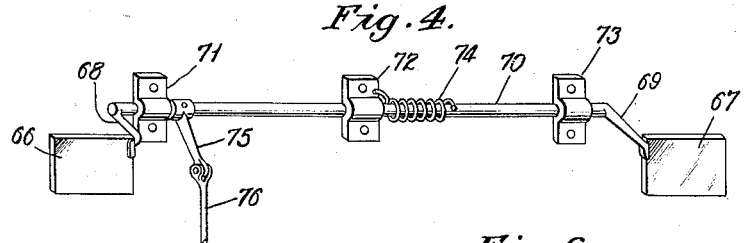
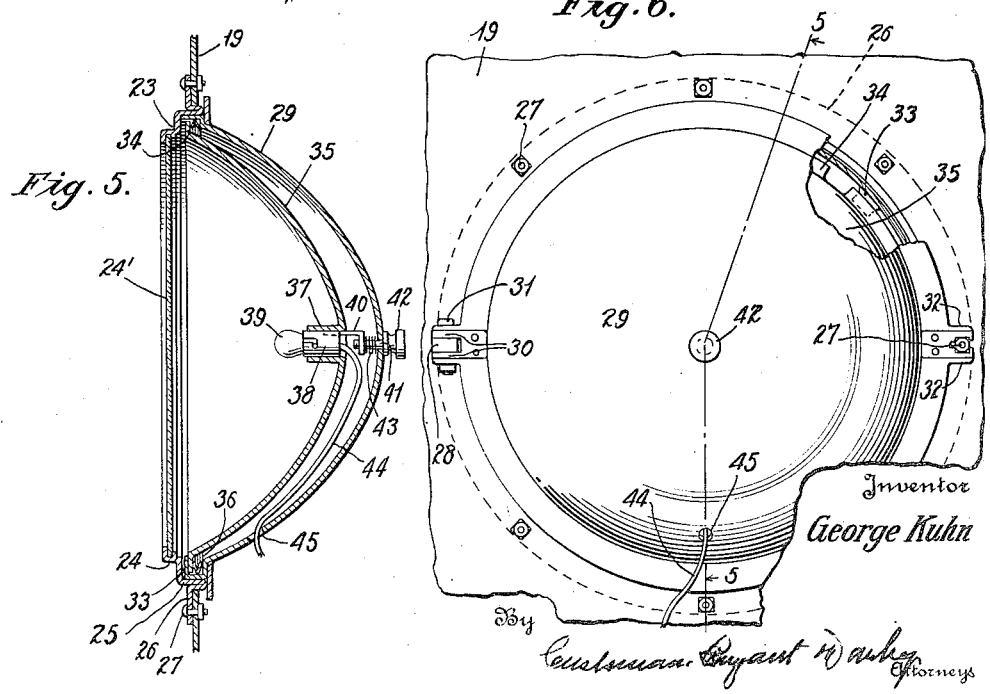
Inventor
George Kuhn

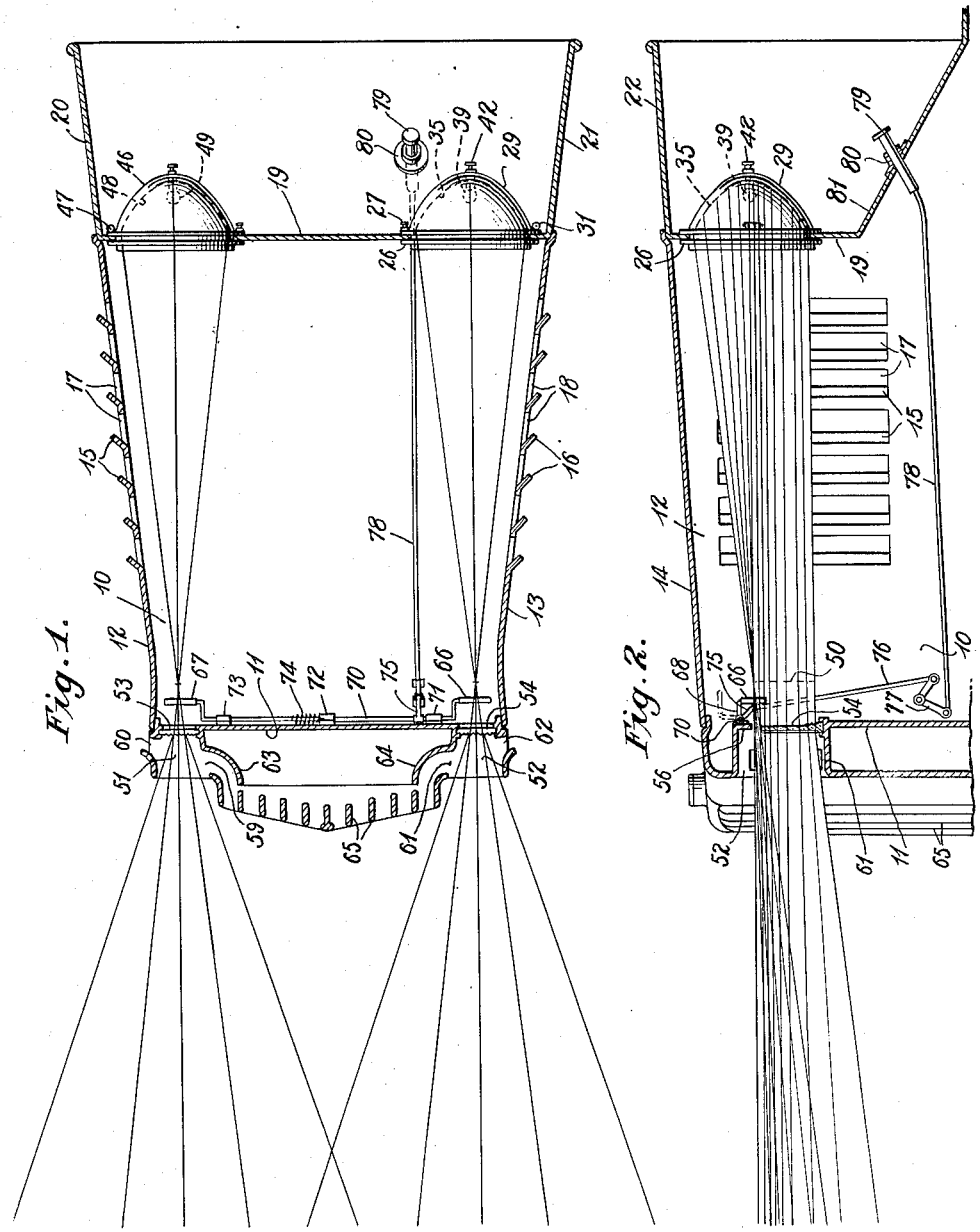

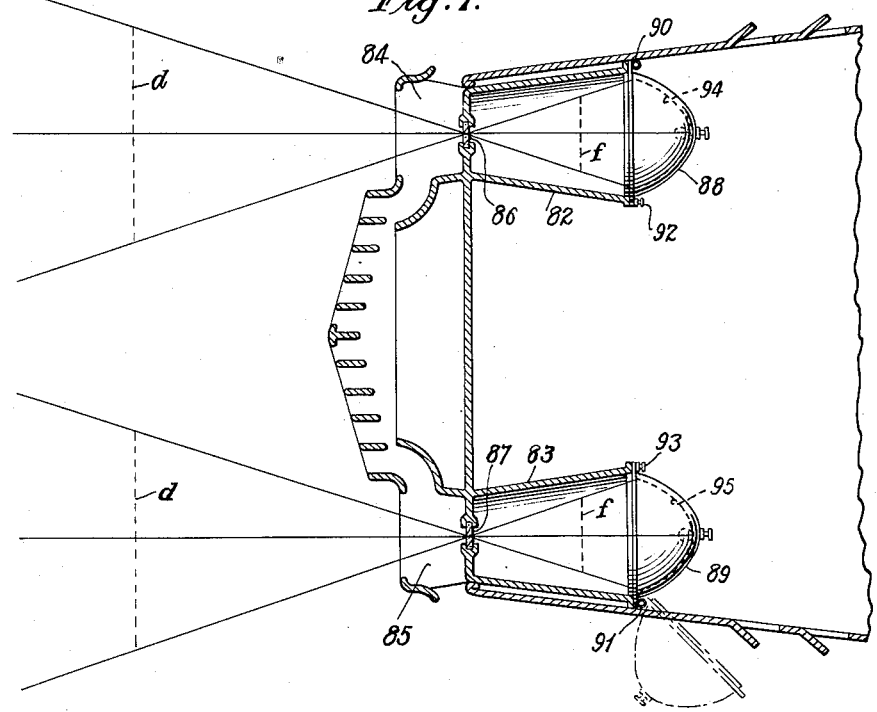
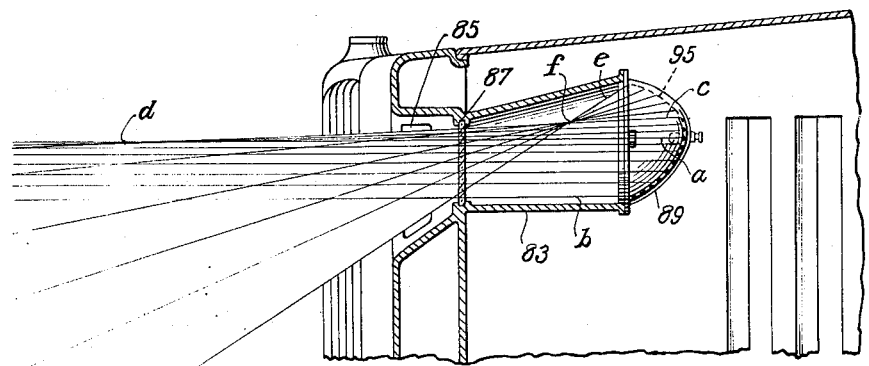

Patented Feb. 18, 1936

2,031,168

UNITED STATES PATENT OFFICE 2,031,168

ILLUMINATING APPARATUS

George Kuhn, Takoma Park, Md., assignor to Butler-Kuhn Corporation, Washington, D. C., a corporation of Delaware Application January 10, 1931, Serial No. 507,919

5 Claims. (Cl. 240—8.11)

The present invention relates to illuminating apparatus adapted for various uses, but particularly applicable to automotive vehicles for projecting light forwardly thereof.

As applied to automotive vehicles, a principal object of the invention is the elimination of external lamp housings and supporting brackets whereby the appearance of the vehicle is greatly improved and the possibility of damage to the structure is, to a large extent, obviated.

A further fundamental object of the invention is the provision of substantially non-glare illuminating means.

Another object is the provision of a headlight readily accessible for bulb adjustment or replacement yet protected from the action of the elements. This protected arrangement of the device also obviates the necessity for expensive ornamental lamp housings.

In carrying out the invention, a reflector is positioned within the main vehicle shell and specifically within the enclosure defined by the hood and cowling of the vehicle so as to direct a beam of light through a target opening provided in the forward wall element of the engine compartment, this element ordinarily being a radiator shell.

The forwardly projected beam, in one embodiment of the invention, traverses the entire length of the engine compartment and is exposed therein so that the light of the beams serves to illuminate the compartment and, further, is visible through slits provided in the sides of the hood, affording side-wall illumination of the vehicle. According to this embodiment of the invention, the reflector is mounted on the dash and is accessible from the driver's seat so that the bulb may be readily replaced or adjusted from the driver's seat.

According to another embodiment of the invention, the reflector is positioned within the engine compartment more or less to the rear of the front wall element thereof. A principal advantage of this disposition of the reflector as over that above discussed is that the reflector can be moved or swung throughout a greater range for the illumination of the vehicle itself, and that the refracting lens may be dispensed with and replaced by a clear glass plate.

A special reflector is preferably provided which projects a beam having an upper portion of considerable intensity relative to the lower portion. In order that the range of the intense portion of the beam may not be impaired, it may be projected without the intervention of any externally exposed lens element, dimming means being provided for use when desired. A lens may be provided for the lower, less intense portion of the beam to refract the rays laterally and downwardly. Inasmuch as the accumulation of drops of water or dirt gives rise to glaring spots, means are preferably provided whereby a current of air is directed across the face of the lens upon forward movement of the vehicle to prevent such accumulation.

In both embodiments of the invention to be hereinafter described, the reflector is adjustable so as to project the beam in angular relation to its normal line whereby various parts of the vehicle may be illuminated to better advantage as when repairs are to be made.

Without further discussion of the general aspects of the invention, I shall proceed to describe it with reference to the two embodiments shown in the accompanying drawings.

In the drawings,

Figure 1 is a horizontal section through the radiator shell, hood, and cowl of an automobile and illustrates one embodiment of the invention;

Figure 2 is a vertical section of the structure shown in Figure 1;

Figure 3 is an elevation of the top portion of a radiator shell showing a typical arrangement of light openings therein;

Figure 4 is a perspective view of the dimming or obscuring means for the intense portion of the beam and also shows the mounting means and a portion of the operating means therefor;

Figure 5 is a section on the line 5—5 of Figure 6;

Figure 6 is a rear elevation of a portion of the dash, a reflector housing, and the mounting means for the reflector housing;

Figure 7 is a horizontal section of the forward end of a motor vehicle and illustrates a second embodiment of the invention; and Figure 8 is a vertical section of the structure shown in Figure 7.

Referring first to Figures 1 to 6, reference numeral 10 designates generally the engine compartment of an automobile, the compartment being bounded forwardly, as here shown, by a wall element in the form of a radiator shell, it being assumed for the sake of illustration that the engine of the vehicle is water cooled. Reference numerals 12 and 13 designate the side walls of the hood and 14 the top wall, the side walls being provided with outwardly struck fins 15 and 16 leaving apertures 17 and 18. Reference numeral 19 designates the dash forming the rear wall of the engine compartment, while the side and top walls of the cowling are designated at 20, 21, and 22 respectively.

The dash 19 is provided adjacent its lateral edges with a pair of circular apertures each adapted to receive a ring 23, Figures 5 and 6, having a portion 24, for supporting a clear glass closure element 24', a short tubular portion 25 projecting within the aperture, and a radial flange portion 26 secured to the margins of the aperture by means of bolts and nuts 27.

In Figures 5 and 6, the ring 23 is assumed to be associated with the left hand dash aperture. Under these circumstances, the ring is provided with a rearwardly extending lug 28, Figure 6, adapted to project through a recess provided in the aperture margin adjacent the edge of the dash and in the horizontal plane of the center of the aperture. A reflector housing 29 is provided with lugs 30 between which lug 28 is engageable, the lugs being provided with vertically registering bores through which a hinge bolt 31 is passed. Diametrically opposite the lugs 30, the housing 29 is provided with lugs 32 adapted to be engaged by one of the bolts and nuts 27 to secure the housing in operative position.

The mouth of the housing is provided with an annular recess adapted to receive the flange 34 of a reflector 35, flange 34 being received and retained within the recess by the usual bayonet joint means, formed in part by fixed lugs as at 33 and pressed outwardly by a spring member 36.

At its central portion, reflector 35 is provided with an axially extending neck 37 adapted to receive and slidably guide a socket 38 in which is supported a bulb 39. Socket 38 has secured thereto a bracket 40 engaged by a threaded bolt 41 passed through an aperture in housing 29 and provided exteriorly thereof with a thumb nut 42. A compression spring 43 is interposed between the bracket 40 and housing 29 so as to urge socket 38 outwardly of the reflector. As will be understood, focusing adjustment of the bulb is accomplished through manipulation of thumb nut 42 which is readily accessible from the driver's seat as is evident from Figure 1. A lead 44 to the bulb is passed outwardly of housing 29 through an aperture 45, the ground connection being secured through bracket 40, bolt 41, and housing 29.

The right hand reflector housing 46 is identically the same as housing 29 with the exception that it is hinged, as by a pin 47, adjacent the right hand edge of the dash. The reflector and bulb associated with housing 46 are indicated at 48 and 49 respectively.

Normally the reflectors are positioned as shown in Figure 1 so as to project beams directly forwardly through the engine compartment. These beams are visible through openings 17 and 18 and thus serve to indicate the position of the vehicle from what have hitherto been more or less blind angles.

The beams also illuminate the interior of the engine compartment but by adjusting the reflector housings about the hinge pins, the beams may be directed at various angles within the compartment to illuminate more effectively mechanism therein which may need attention.

As particularly illustrated in Figures 1 and 2, each of the reflectors, which has a normally substantially horizontally extending light axis, has an upper portion adapted to converge laterally and vertically the rays projected thereby. To accomplish this result the upper portion of each reflector is made elliptical in both horizontal and vertical sections, that is, the surface of the upper portion is in the form of a part of a true ellipsoid of revolution whose axis coincides with the optical axis of the reflector, the source of light being placed at the proximate focus of the ellipsoid.

The lower portion of each reflector converges the rays laterally, while projecting them in parallelism as to the vertical relation, that is, the rays are projected in a series of horizontal strata, all strata converging laterally in a series of remote foci in front of the reflector, thus forming a vertical locus 50. To secure this result, the lower portion of each reflector is elliptical in horizontal section and parabolic in vertical section, the ellipse of the central horizontal section, the parabola of the vertical central section and the ellipsoid of the upper reflector portion all having a common proximate focus at the light source and a common horizontal axis constituting the optical axis of the reflector, the upper and lower portions merging together into a continuous concave surface, transverse section of which is semicircular in the upper portion and semi-elliptical in the lower section.

Thus the rays projected by the lower reflector portion converge on a substantially vertical line 50, Figure 2, while the rays projected by the upper reflector portion may converge at a point 30 at the top of this line. The rays originating in the adjacent sections of the top and bottom reflector portions substantially unite and occupy the top portion of the projected beam, thus producing a beam having a relatively intense top portion.

As shown in Figures 1 and 2, line 50 lies somewhat to the rear of the shell 11. In this connection it should be pointed out that the position of the line 50 may be varied as desired and the rays projected by the upper half of the projector may be converged at a point horizontally spaced from line 50 or the upper rays may be converged on separate horizontal and vertical lines horizontally spaced. For the purpose of illustration, I have shown the simplest arrangement. It is desirable, however, that the location of convergence of the top and bottom rays projected by the upper reflector portion be kept at a relatively great distance from the reflector so that their converging angle will be as acute as possible, thus assuring a concentrated beam.

The radiator shell 11, as shown, is of substantial thickness and is provided with substantially tubular light openings or passages 51 and 52 to the rear of which are positioned lenses 53 and 54, and supported in the passages in any suitable manner. As particularly shown in Figures 2 and 3, the lenses terminate upwardly on a horizontal line immediately below the lowermost ray of the beam projected by the upper reflector portion, open spaces thus being left for the passage of the upper portion of the beams. The upper walls of the passages terminate rearwardly in downwardly projecting flanges 55 and 56 which terminate on a horizontal line immediately above the top of the beams. Inasmuch as the tops of the beams are on a level with the axes of the reflectors, it follows that the upper portions of the reflectors will be hidden from any point of view above a horizontal plane coincident with the lower edges of the flanges 55 and 56. In order to expand the lower portion of the beam laterally and also to prevent glare, the outer face of lenses 53 and 54 are provided with vertical refracting ribs or corrugations as at 57 and 58. The lower rear faces of the lenses are stepped transversely to afford a prismatic area which reflects downwardly the rays passing therethrough and thereby throwing light on the road directly in front of the vehicle.

In order to keep the lenses clear of accumulations of water and dust particles, I provide passages 51 and 52 with lateral opposed openings 59, 60, and 61, 62, respectively. Baffles or scooplike formations 63 and 64 are arranged behind radiator shutters 65 so that with the shutters open and the vehicle moving forward, a current of air is directed through openings 59 and 61 and across the faces of the lenses to be discharged through openings 60 and 62. Thus, particles of water and dust entering the passages will be caught by the air currents and prevented from reaching the lenses.

In order that the intense upper portion of the beams may be dimmed or obscured, I provide plates or screens 66 and 67, Figures 1, 2, and 4, which may be moved into the paths of these beam portions. As here shown, the plates are supported on arms 68 and 69 secured to a rock shaft 70 which is rockably supported by means of clips 71, 72, and 73 secured to the inner face of the radiator shell. A coil spring 74 is mounted on shaft 70 with one end secured thereto and the other end bearing against clip 72 and tending to hold plates 66 and 67 in the dotted line position of Figure 2. An arm 75 secured to the rock shaft is connected by means of a link 76 to one arm of a bell crank lever 77 to the other arm of which is connected a push rod 78 terminating in a foot button 79 guided in a ferrule 80 mounted on the floor board 81 immediately in front of the driver's position. By pushing on the button 79, it will be evident that plates 66 and 67 may be swung from the dotted line position of Figure 2 to the full line position so as to overlie the unobstructed portions of the light openings above the lenses. Automatic, gravity operated means may be used to bring the plates into the lowered position when the body of the car tilts upward as when approaching the crest of a hill. The plates may be of colored glass, of semi-transparent screen or louver arrangement, or of opaque metallic plate. In the first two instances, they may extend either part way down the beam, as shown, or cover the whole light opening.

According to Figures 7 and 8, tubular members 82 and 83, having imperforate or perforate walls, are mounted in rearward continuation of light openings 84 and 85, narrow transparent closure plates ordinarily of glass, 86 and 87 being supported at the forward ends of members 82 and 83. Reflector casings 88 and 89 are respectively mounted at the rear ends of members 82 and 83 on hinge pins 90 and 91, the housings being securable in normal registering relation with the openings of members 82 and 83 by means of thumb nuts 92 and 93.

It will be evident that with this construction, the reflector housings may be swung about their hinge mountings to a considerable degree, the hood being raised. In Figure 7, the housing 89 is shown in dotted lines in position to illuminate the rear portion of the engine compartment and by swinging the housing further, the vehicle may be illuminated by a rearwardly projected beam.

According to this embodiment of the invention, the reflectors 94 and 95 are of somewhat modified form. The portions of the reflectors below the light axes are parabolic in vertical section and elliptical in horizontal section to project a beam bounded by the upper and lower parallel rays $a$ and $b$. The rays of these beams cross on upright lines substantially at the plates 86 and 87. That portion of each reflector above the light axis is elliptical in horizontal section and in vertical section is defined by segments of elipses having horizontally spaced axes. As shown in Figure 8, the portion of the reflector between rays $a$ and $c$ converges these rays on a vertical line substantially at the lens and on a horizontal line located at $d$. That portion of the reflector between the rays $c$ and $e$ converges these rays on a horizontal line $f$ and on vertical line substantially at the transparent plate. The converging angle between rays $c$ and $e$ being relatively great, the rays will have a large vertical spread immediately in front of the vehicle to afford close-up illumination.

Rays $a$ and $c$, having a relatively acute angle of convergence, will define a concentrated beam for distant illumination. Inasmuch as all of the rays converge on a vertical line or lines at the transparent plate the latter may be relatively narrow, as indicated in Figure 7.

The position of the light openings may vary to meet varying conditions. As shown in Figures 1, 2 and 3, the radiator shell is provided with shoulders to accommodate the light openings, and in such case, the walls of the hood will be somewhat outwardly bulged to the rear of the shoulders to correspond therewith and to permit the passage of the beams.

Due to the crossing of the rays on vertical lines, the reflectors may be positioned at the outer edges of the dash so that the beams projected thereby will be entirely clear of the motor and other obstructions and at the same time necessitate very little, if any, lateral expansion of the radiator shell to accommodate the light openings. This is in recognition of the usual practice of tapering the hood forwardly from the cowling.

According to the embodiment of Figures 7 and 8, no lateral enlargement of the engine compartment will be necessary in most cases.

Although I have described specific embodiments of my invention for the purpose of illustration, it will be understood that I do not limit myself to structure except as in the folllowing claims.

I claim:

1. In combination with the outer shell of a motor vehicle having a forward substantially upright wall portion, said wall portion having therein a light emitting opening, a projector having a horizontal axis and mounted within said shell in rearwardly spaced relation to said opening to project a beam of light in a forward direction, the bottom of said opening being substantially at the level of the bottom of said beam, the height of said opening being not less than half the depth of said beam at the projector, the width of said opening being considerably less than the width of said beam at the projector and than the height of said opening, said projector producing a beam the rays of which are converged laterally and crossed at a locus lying in a vertical plane passing through the optical axis of the projector and in the vicinity of said opening, said rays forming a pattern at the light opening substantially conforming to the size and shape of the latter, and means positioned between said projector and said opening and movable into the beam to modify the character thereof.

2. In combination with the outer shell of a motor vehicle having a substantially upright forward wall portion, a light projector comprising a forwardly faced concave reflector having a substantially horizontal optical axis and a focal point on said axis, a source of light at said focal point, said reflector having its light emitting opening at its greatest transverse section; a glass closure for said light emitting opening, said projector being positioned a distance behind said forward wall portion and said forward wall portion having a laterally restricted and vertically elongated light-passing opening, said projector projecting a forward laterally converging beam through the intervening space between the light emitting opening of said projector and the light passing opening in said forward wall portion, said intervening space being sufficiently great to permit crossing of the laterally outermost projected rays at an acute angle, the rays of said beam crossing at a locus lying in the vertical plane of said optical axis and in proximity to said light passing opening and said opening allowing unobstructed passage of the whole beam.

3. Apparatus according to claim 2, wherein the projector comprises a forwardly faced reflecting surface consisting of upper and lower sections, said upper section projecting a beam of vertically converging rays, said lower section projecting a beam of vertically parallel rays, said lower section being greater in area than said upper section, the upper edge of the light passing opening in the forward wall portion of the vehicle being on substantially the same horizontal level with the division line between said upper and lower sections of the reflector.

4. In combination with the outer shell of a motor vehicle having a substantially upright forward wall portion provided with a laterally restricted light emitting opening, a light projector mounted within said outer shell behind and at a distance from said forward wall portion, said light projector projecting a forward beam of light through said opening, a glass closure for said opening, and means comprising a scooplike wall formation in front of and to one side of said opening and outside of said beam whereby a cross-current of air is generated upon forward movement of the vehicle at right angles to its motion and across the face of said glass closure, and an unobstructed outlet in the path of said cross-current on the opposite side of said glass closure through which particles of rain, snow, dust, and the like, may be blown sideways so that the surface of said glass closure is kept clean during the forward motion of the vehicle.

5. In combination with the outer shell of a motor vehicle having a substantially upright forward wall portion, an optical system comprising two separate units mounted independently and at a distance from each other, the first unit constituting beam generating means and comprising a forwardly faced concave reflector of relatively large cross-sectional area and having a horizontal optical axis, said reflector being equipped with a glass closure at its greatest transverse section, said beam-generating unit being mounted within said outer shell and at a distance behind the forward wall portion thereof and projecting a laterally converging forwardly directed beam of light whose rays cross at a locus lying in the vertical plane containing said optical axis beyond and at a distance from said glass closure and in proximity to said forward wall portion, said distance being sufficiently great to permit lateral crossing of all the rays at said locus at an acute angle, there being a laterally restricted vertically elongated target opening in said forward wall portion in the path of said beam and in proximity to said locus, the second unit constituting beam modifying means and comprising a laterally dispersing glass closure in said target opening whereby the acutely crossed rays of said beam are given increased lateral spread forwardly of said dispersing glass closure, the walls of said outer shell of the motor vehicle forming a housing for the system and shielding it from all points of view outside of the projected beam.

GEORGE KUHN.